United States Patent
Jeong et al.

(10) Patent No.: US 8,300,759 B2
(45) Date of Patent: Oct. 30, 2012

(54) DECAY HEAT REMOVAL SYSTEM COMPRISING HEAT PIPE HEAT EXCHANGER

(75) Inventors: Hae Yong Jeong, Daejeon (KR); Chungho Cho, Daejeon (KR); Yong Bum Lee, Daejeon (KR); Dong Uk Lee, Seoul (KR); Jae Hyuk Eoh, Seoul (KR); Kwi Seok Ha, Daejeon (KR)

(73) Assignees: Korea Atomic Energy Research Institute, Daejeon (KR); Korea Hydro and Nuclear Power Co., Ltd, Seoul (KR)

( * ) Notice: Subject to any disclaimer, the term of this patent is extended or adjusted under 35 U.S.C. 154(b) by 820 days.

(21) Appl. No.: 12/355,088

(22) Filed: Jan. 16, 2009

(65) Prior Publication Data

US 2009/0245453 A1    Oct. 1, 2009

(30) Foreign Application Priority Data

Mar. 25, 2008  (KR) ........................ 10-2008-0027317

(51) Int. Cl.
*G21C 9/00* (2006.01)
(52) U.S. Cl. ..................... 376/299; 376/290; 376/403
(58) Field of Classification Search .................. 376/299, 376/298, 290, 404, 403, 405
See application file for complete search history.

(56) References Cited

U.S. PATENT DOCUMENTS

| | | | | | |
|---|---|---|---|---|---|
| 4,478,784 | A | * | 10/1984 | Burelbach | 376/298 |
| 4,487,742 | A | * | 12/1984 | Bret | 376/298 |
| 4,560,533 | A | * | 12/1985 | Huebotter et al. | 376/367 |
| 4,608,224 | A | * | 8/1986 | Brachet | 376/405 |
| 4,780,270 | A | * | 10/1988 | Hundal et al. | 376/299 |
| 5,195,575 | A | * | 3/1993 | Wylie | 165/132 |
| 5,223,210 | A | * | 6/1993 | Hunsbedt et al. | 376/290 |

FOREIGN PATENT DOCUMENTS

| WO | WO-2007/034290 A1 | 3/2007 |
|---|---|---|
| WO | WO-2008/048031 A1 | 4/2008 |

OTHER PUBLICATIONS

Arul et al., "Reliability analysis of safety grade decay heat removal system of Indian prototype fast breeder reactor," Annals of Nuclear Energy, 33(2006), pp. 180-188.*

* cited by examiner

*Primary Examiner* — Ricardo Palabrica
(74) *Attorney, Agent, or Firm* — Nelson Mullins Riley & Scarborough LLP; EuiHoon Lee, Esq.

(57) ABSTRACT

Disclosed herein is a decay heat removal system, including: a decay heat exchanger that absorbs decay heat generated by a nuclear reactor; a heat pipe heat exchanger that receives the decay heat from the decay heat exchanger through a sodium loop for heat removal and then discharges the decay heat to the outside; and a sodium-air heat exchanger that is connected to the heat pipe heat exchanger through the sodium loop and discharges the decay heat transferred thereto through the sodium loop to the outside. According to the decay heat removal system, a heat removal capability can be realized by the heat pipe heat exchanger at such a high temperature at which the safety of a nuclear reactor is under threat, and a cooling effect can be obtained through the sodium-air heat exchanger at a temperature lower than that temperature.

3 Claims, 6 Drawing Sheets

DECAY HEAT REMOVAL SYSTEM COMPRISING HEAT PIPE HEAT EXCHANGER

CROSS-REFERENCE TO RELATED APPLICATION

This application claims the benefit of Korean Patent Application No. 10-2008-0027317 filed Mar. 25, 2008 in the Korean Intellectual Property Office, the disclosure of which is incorporated herein in its entirety by reference.

BACKGROUND OF THE INVENTION

1. Field of the Invention

The present invention relates to a decay heat removal system comprising a heat pipe heat exchanger, and, more particularly, to a decay heat removal system comprising a heat pipe heat exchanger, by which decay heat in a liquid metal-cooled reactor is passively removed.

2. Description of the Related Art

A liquid metal-cooled reactor is a nuclear reactor, in which energy produced by a nuclear fission reaction using fast neutrons is absorbed into a liquid metal coolant and thus transferred to a steam generator to generate steam, and then an electric generator is operated using the generated steam to produce electricity.

Recently, in order to prepare for a steam generator losing its function of normally removing decay heat (residual heat) generated from a core of a nuclear reactor after the reactor has been scrammed, a liquid metal-cooled reactor is equipped with a passive decay heat removal system for removing the decay heat remaining in its core using natural phenomena.

FIG. 1 is a schematic view showing a conventional decay heat removal system for a liquid metal-cooled reactor.

Referring to FIG. 1, a conventional decay heat removal system 10 for a liquid metal-cooled reactor, in which pools are directly cooled, includes a decay heat exchanger 11, a sodium-air heat exchanger 12, and a sodium loop 13 for heat removal.

The decay heat exchanger 11 is provided in a hot pool 15 such that it is located under the liquid level of hot sodium, the sodium-air heat exchanger 12 is provided at the upper portion of a building (not shown) provided with the liquid metal-cooled reactor, and the sodium loop 13 for heat removal serves to connect the decay heat exchanger 11 with the sodium-air heat exchanger 12.

According to the above-configured decay heat removal system 10, decay heat generated from the liquid metal-cooled reactor is discharged to the atmosphere, which is a final heat sink, by the natural circulation of sodium using the difference in density of sodium in the sodium loop 13, caused by the difference in height between the decay heat exchanger 11 into which the decay heat is introduced and the sodium-air heat exchanger 12 from which the decay heat is removed to the atmosphere.

In the above-configured decay heat removal system 10, dampers 18 are respectively provided in an air inlet 16 and an air outlet 17 of the sodium-air heat exchanger 12 to control the amount of air, and valves 19 are provided in the sodium loop 13 to control the amount of sodium, thereby preventing the solidification of sodium in the sodium loop 13 and controlling the amount of heat loss during normal operation.

However, the decay heat removal system 10 is problematic in that, although its heat removal function is performed by just the natural circulation of a heat transfer medium (sodium), the dampers 18 and valves 19 are intentionally operated, and thus a fully passive decay heat removal system cannot be realized, thereby deteriorating the operational safety related to the operational reliability of the decay heat removal system 10.

FIG. 2 is a schematic view showing another conventional decay heat removal system 20 for a liquid metal-cooled reactor.

Referring to FIG. 2, as another conventional decay heat removal system 20 for a liquid metal reactor, a fully passive decay heat removal system, including a decay heat exchanger 24, a sodium-air heat exchanger 26 whose air inlet 27 and air outlet 28 are not provided therein with dampers and a sodium loop 25 for heat removal which is not provided therein with valves, is employed.

In the decay heat removal system 20, the decay heat exchanger 24 is provided over a cold pool 23 in a vertical-type cylindrical tube 21 provided to connect the cold pool 23 with a hot pool 22.

The difference in liquid levels between the hot pool 22 and the cold pool 23 is maintained constant during normal operation by the pumping of a primary pump (not shown).

For this reason, when decay heat is generated during normal operation, the decay heat in the hot pool 22 is absorbed into the decay heat exchanger 24 by radiation.

The decay heat exchanger 24 is connected to the sodium-air heat exchanger 26 provided at the upper portion of a reactor building (not shown) in which the liquid metal-cooled reactor is installed. The decay heat absorbed into the decay heat exchanger 24 by radiation is transferred to the sodium-air heat exchanger 26 through the sodium loop 25 by the difference in density of sodium, caused by the difference in height between the decay heat exchanger 24 and the sodium-air heat exchanger 26, then to the outside.

Meanwhile, when the reactor core is scrammed, the operation of primary pump is also stopped, so that the difference in liquid level between the hot pool 22 and the cold pool 23 disappears and simultaneously sodium in the hot pool 22 directly comes into contact with the decay heat exchanger 24, with the result that the decay heat exchanger 24 can absorb heat from the sodium in the hot pool 22 by convection.

Therefore, the decay heat exchanger 24 having absorbed the heat from the sodium in the hot pool 22 by convection transfers the absorbed heat to the sodium-air heat exchanger 26 through the sodium loop 25, thereby discharging the heat to the outside.

That is, in the conventional decay heat removal system 20, decay heat is discharged to the outside through a heat transfer process by radiation when the liquid metal-cooled reactor (not shown) is normally operated, whereas the decay heat is discharged to the outside through a heat transfer process by convection when the operation of the primary pump is stopped.

Accordingly, this conventional decay heat removal system 20 is advantageous in that a fully passive decay heat removal system is realized by removing artificial means such as dampers, valves and the like, but is problematic in that, when the temperature of air or a sodium loop decreases, liquid sodium in the sodium loop solidifies, thus deteriorating its heat removal function which is important for reactor safety.

SUMMARY OF THE INVENTION

Accordingly, the present invention has been made to solve the above problems, and an object of the present invention is to provide a decay heat removal system including a heat pipe heat exchanger which can improve the operation safety of the decay heat removal system and can control heat removal capability.

In the decay heat removal system including the heat pipe heat exchanger, a heat pipe heat exchanger serves to perform a fully passive air cooling of the heat transferred from a decay heat exchanger, and a sodium-air heat exchanger provided therein with dampers serves to control a cooling rate.

In order to accomplish the above object, the present invention provides a decay heat removal system, including: a decay heat exchanger that absorbs decay heat generated by a nuclear reactor; a heat pipe heat exchanger that receives the decay heat from the decay heat exchanger through a sodium loop for heat removal and then discharges the decay heat to the outside; and a sodium-air heat exchanger that is connected to the heat pipe heat exchanger through the sodium loop and discharges the decay heat transferred thereto through the sodium loop to the outside.

The heat pipe heat exchanger may be divided into a cold part including a first air outlet at a top thereof and a first air inlet at a bottom thereof and a hot part filled with sodium, and may be provided therein with a heat pipe, one side of which is in contact with the hot part and the other side of which is exposed to the cold part.

The heat pipe may be filled with a predetermined working fluid having a predetermined pressure to provide a desired operating temperature.

For example, when NaK is used as the working fluid, the heat pipe can be designed such that it is operated at a temperature of 27~727° C., and the NaK can be usefully used to remove decay heat in a liquid metal-cooled reactor.

The sodium-air heat exchanger may be provided at a top thereof with a second air outlet and at a bottom thereof with a second air inlet, wherein the second air outlet and the second air inlet may be provided with dampers, respectively.

The heat transfer from the hot part to the cold part through the heat pipe may be performed by conduction when a nuclear reactor is normally operated.

When the nuclear reactor is normally operated, the temperature of the hot part may be lower than the boiling point of a working fluid.

When the nuclear reactor is abnormally operated, the decay heat transferred to the sodium-air heat exchanger can be cooled by the air supplied from the outside by controlling the opening of the dampers.

When the temperature of the hot part is continuously increased even in a state in which the dampers are maximally opened, the working fluid may be circulated in the heat pipe and simultaneously may be repeatedly boiled and condensed repeatedly by the decay heat transferred to the hot part, and thus may be cooled by air supplied through the first air inlet.

The sodium loop may be connected to the hot part of the heat pipe heat exchanger.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
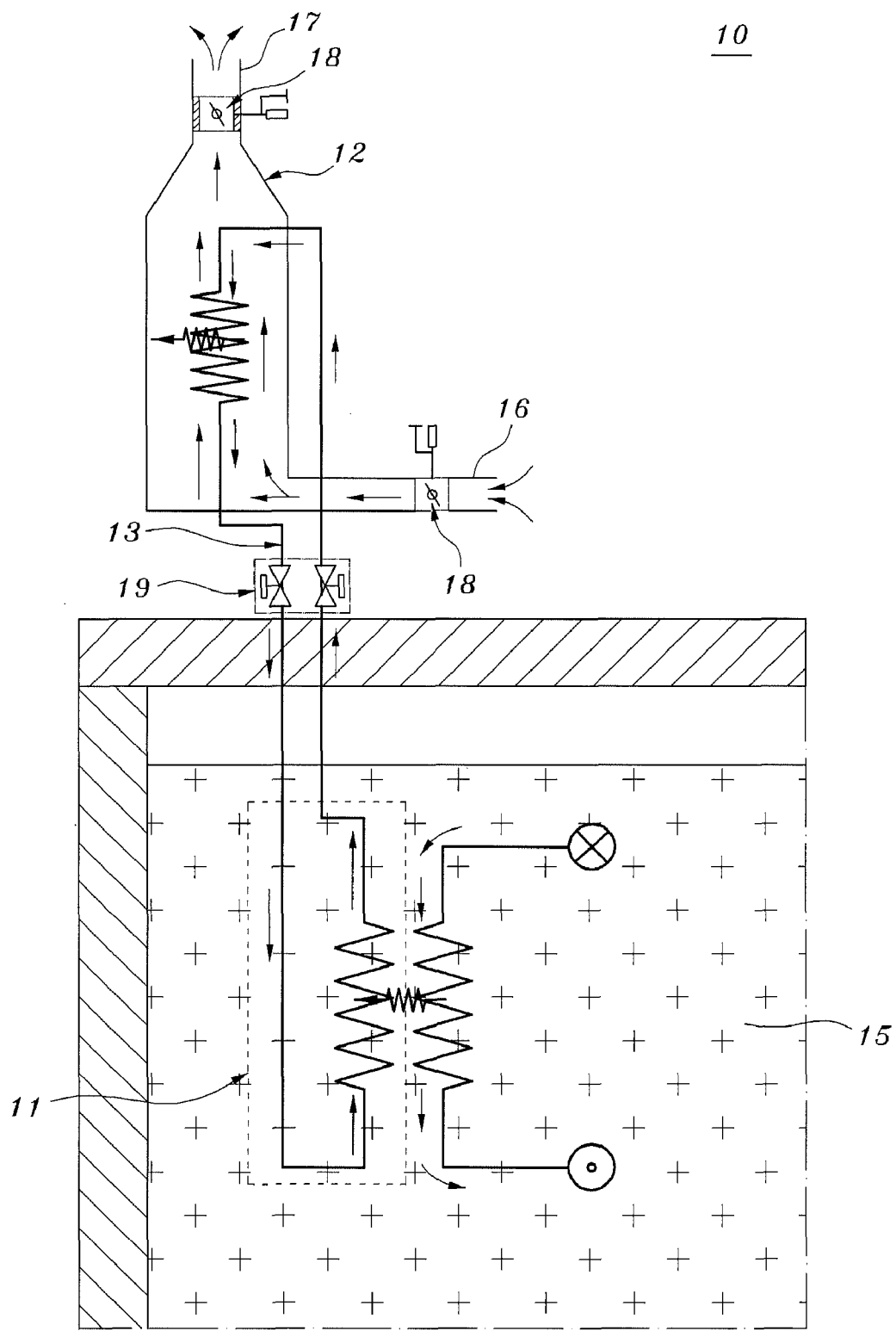
FIG. 1 is a schematic view showing a conventional decay heat removal system for a liquid metal reactor.
Figure 2:
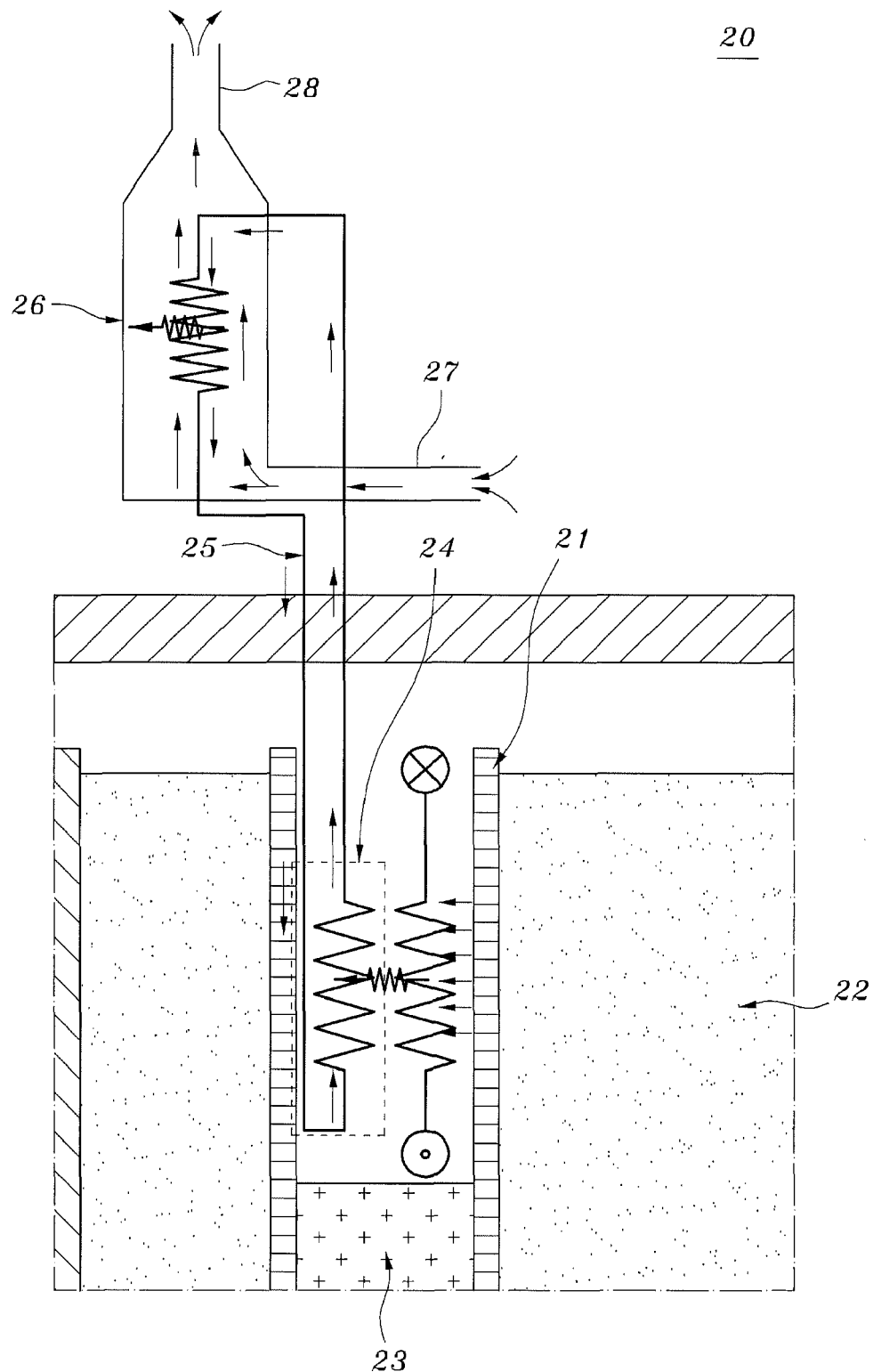
FIG. 2 is a schematic view showing another conventional decay heat removal system for a liquid metal reactor.
Figure 3:
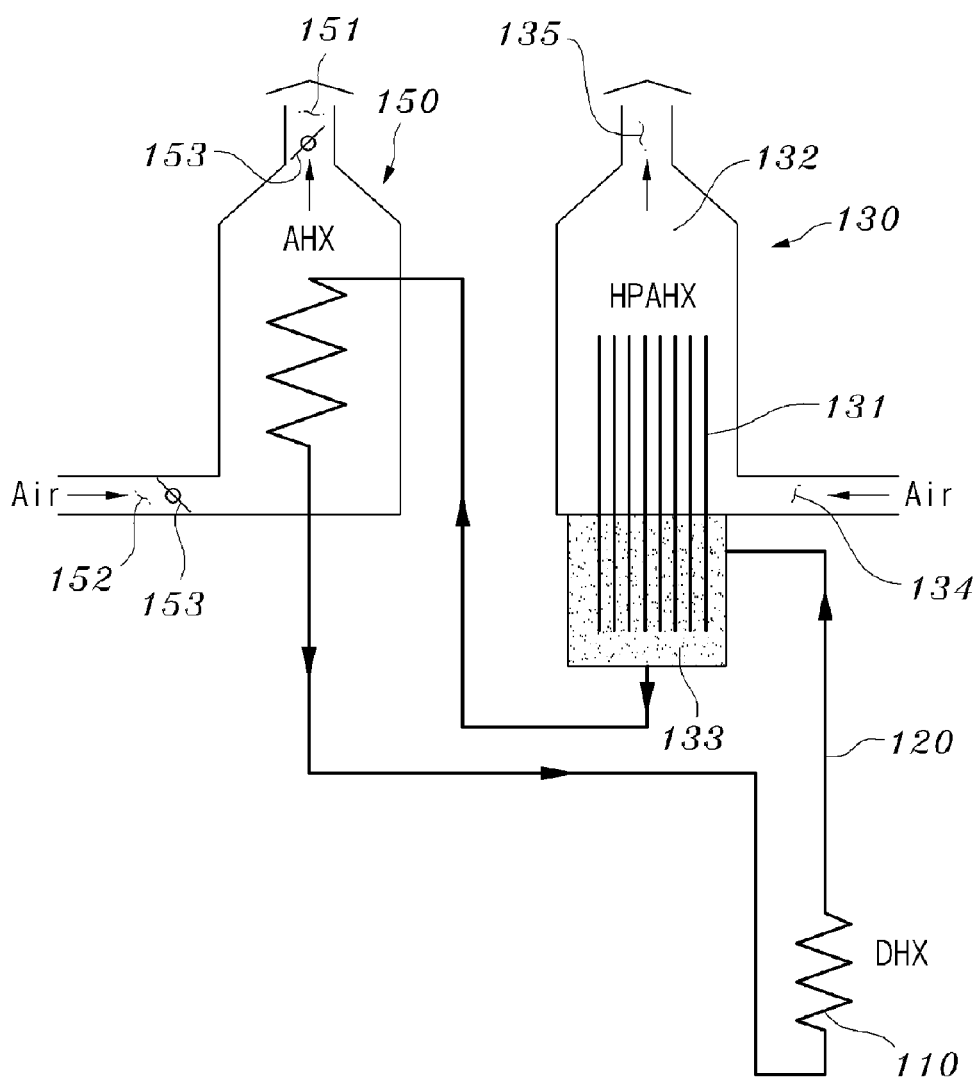
FIG. 3 is a schematic view showing a decay heat removal system including a heat pipe heat exchanger according to an embodiment of the present invention.

FIG. 3 is a schematic view showing a decay heat removal system including a heat pipe heat exchanger according to an embodiment of the present invention.

Referring to FIG. 3, a decay heat removal system including a heat pipe heat exchanger 100 includes a decay heat exchanger (DHX) 110, a sodium loop 120 for heat removal, a heat pipe heat exchanger (HPAHX) 130, and a sodium-air heat exchanger (AHX) 150.

The decay heat exchanger 110 serves to absorb decay heat generated by a nuclear reactor (not shown).

The heat pipe heat exchanger 130 is connected to the decay heat exchanger 110 through the sodium loop 120.

The decay heat absorbed into the decay heat exchanger 110 from the nuclear reactor is transferred to the heat pipe heat exchanger 130 through the sodium loop 120 operated by the differences in the density of sodium.

That is, since the decay heat exchanger 110 and the heat pipe heat exchanger 130 are disposed such that they are positioned at different levels, the decay heat absorbed into the decay heat exchanger 110 can be transferred to the heat pipe heat exchanger 130 through the sodium loop 120 which is a heat transfer channel operated by the difference in the density of sodium.

The heat pipe heat exchanger 130 is divided into a hot part 133 and a cold part 132, and accommodates therein heat pipes 131, one side of which is in contact with the hot part 133 and the other side of which is exposed to the cold part 132.

Since the hot part 133 is located in the lower portion of the heat pipe heat exchanger 130 and is filled with sodium, which is a heat transfer medium, the decay heat can be transferred to the hot part 133 through the sodium loop 120 connected to the hot part 133.

The cold part 132 is located above the hot part 133 of the heat pipe heat exchanger 130. A first air outlet 135 is provided at the top of the cold part 132, and a first air inlet 134 is provided at the bottom thereof.

Figure 4:
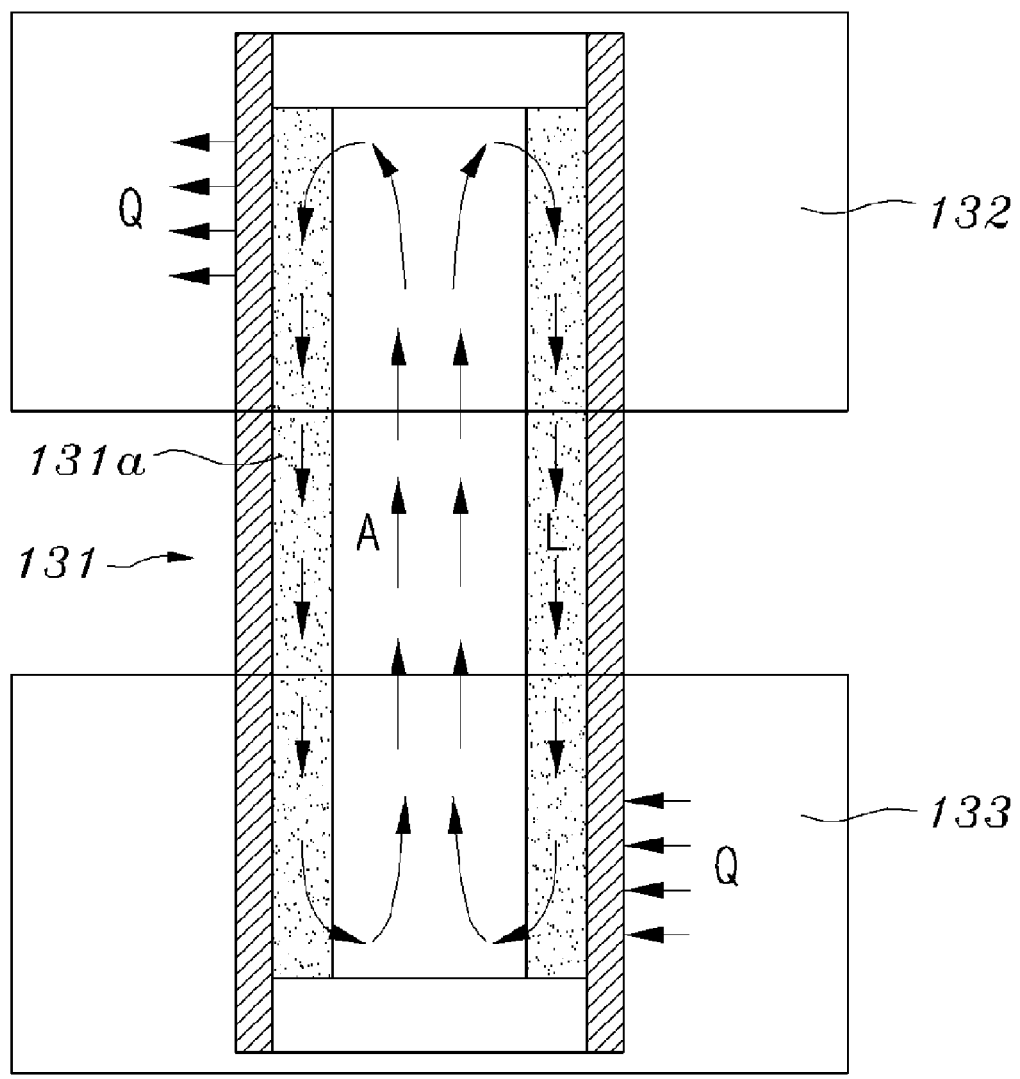
FIG. 4 is a schematic view explaining the operation of a heat pipe of FIG. 3.

FIG. 4 is a schematic view explaining the operation of the heat pipe of FIG. 3.

Referring to FIG. 4, the heat pipe 131 is charged with a predetermined working fluid 131a, and may be a heat transfer mechanism having a hermetical space therein.

Since the heat pipe 131 can be designed such that the working fluid 131a has a predetermined boiling point depending on the kind of the working fluid 131a and the pressure of the heat pipe 131, it can passively transfer heat at a predetermined temperature.

In the heat pipe 131 located in the hot part 133, the working fluid 131a is boiled to produce a vapor (A), and thus heat (Q) is transferred to the heat pipe 131 exposed to the cold part 132 through the vapor (A). Then, in the cold part 132, the transferred heat (Q) is discharged to the outside, and simultaneously the vapor (A) is condensed into a liquefied working fluid again, and then the liquefied working fluid returns to the hot part 133.

That is, as the working fluid 131a is repeatedly vaporized and condensed, it is circulated in the heat pipe 131 thus transferring the heat in the hot part 132 to the cold part 132 and is then discharged to the outside.

The working fluid 131a may be formed of NaK. When NaK is used as the working fluid 131a, the heat pipe 131 can be designed such that it is operated at a temperature range of 27~727° C., the temperature range including that of decay heat generated by a general liquid metal-cooled reactor.

The sodium-air heat exchanger 150 is connected to the hot part 133 of the heat pipe heat exchanger 130 through the sodium loop 120.

The sodium-air heat exchanger 150 is provided at the top thereof with a second air outlet 151 and is provided at the bottom thereof with a second air inlet 152. The second air outlet 151 and the second air inlet 152 are provided therein with dampers 153 for controlling the amount of air, respectively.

Figure 5:
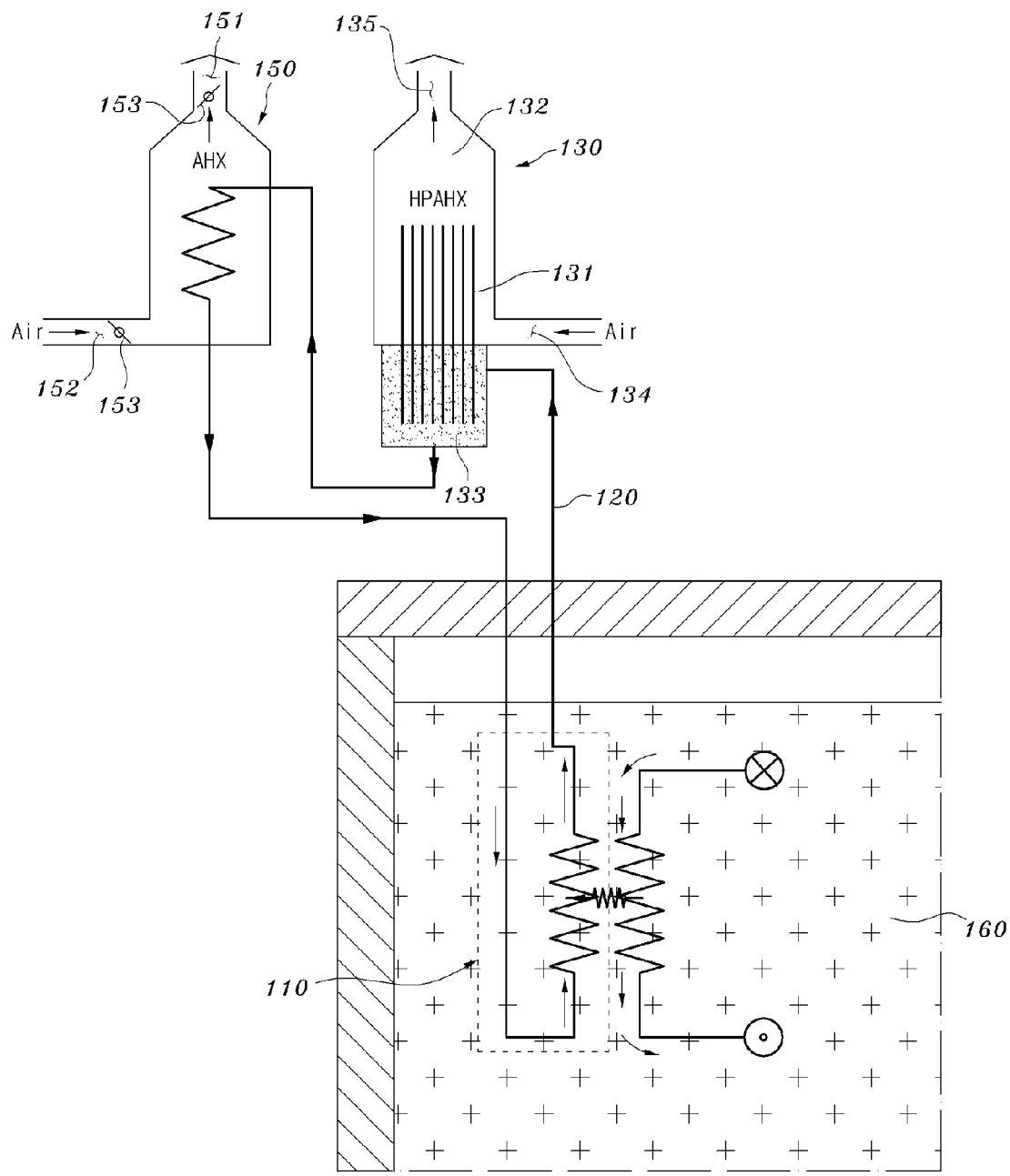
FIGS. 5 and 6 are views showing the placements of decay heat exchangers of FIG. 3, respectively.
Figure 6:
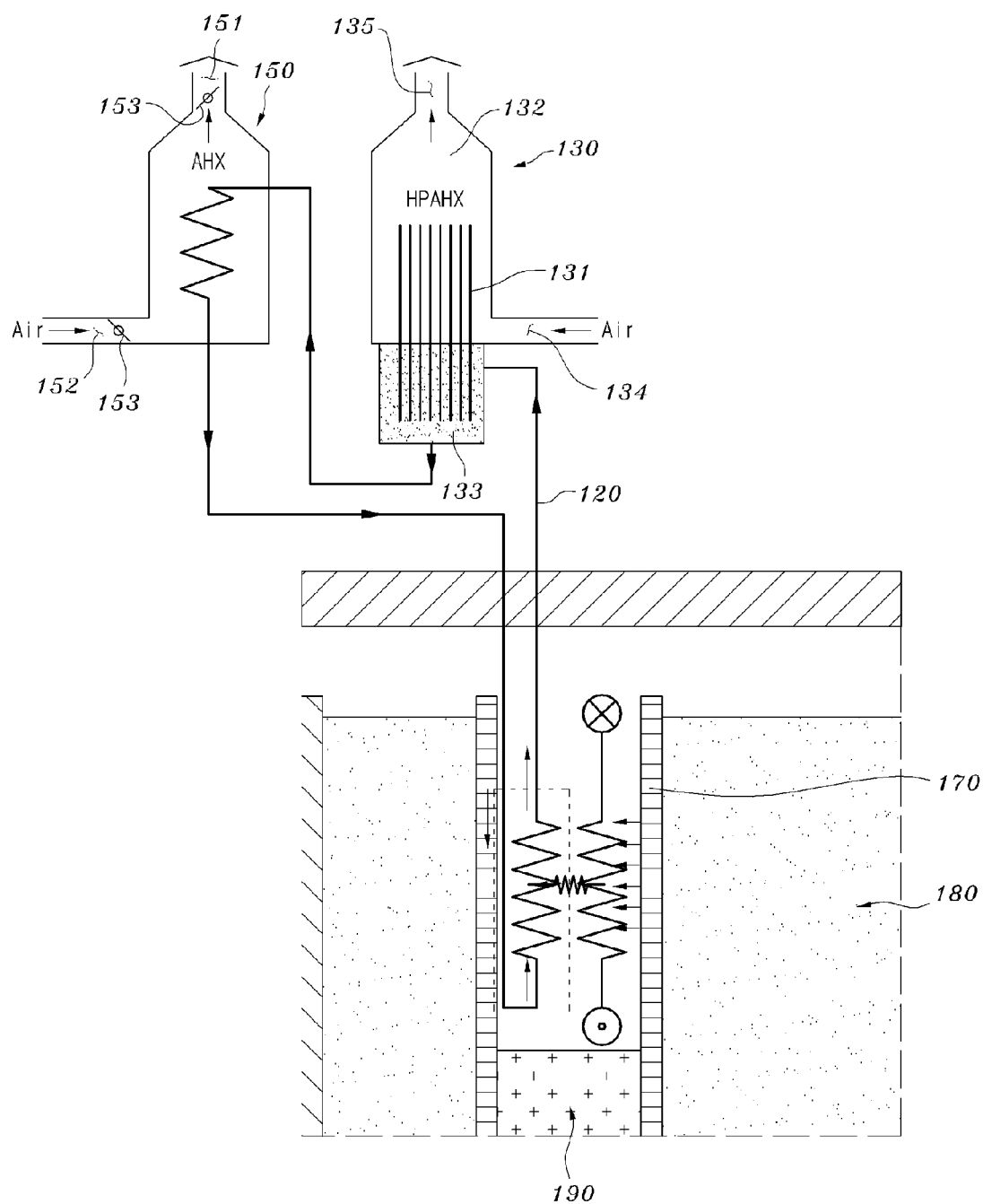

FIGS. 5 and 6 are views showing the placements of the decay heat exchangers of FIG. 3, respectively.

Referring to FIG. 5, in the decay heat removal system 200 including the heat pipe heat exchanger, the decay heat exchanger 110 is immersed in sodium contained in a hot pool 160, and absorbs the decay heat generated from a nuclear reactor by convection.

Referring to FIG. 6, in the decay heat removal system 300 including the heat pipe heat exchanger, the decay heat exchanger 110 is placed over a cold pool 190 which is isolated from a hot pool 180 by a vertical-type cylindrical tube 170 such that there is a difference in liquid level between the hot pool 180 and the cold pool 190, and thus the decay heat exchanger 110 does not directly come into contact with sodium in the cold pool 190.

Therefore, in a normal condition, the decay heat exchanger 110 absorbs heat from the hot pool 180 through the vertical-type cylindrical tube 170 by radiation, and, in an abnormal condition in which the sodium in the hot pool 180 overflows the vertical-type cylindrical tube 170 and then mixes with the sodium in the cold pool 190, the decay heat exchanger 110 absorbs heat by convection.

The above decay heat removal system including the heat pipe heat exchanger can be operated as follows.

As described above, decay heat generated by a nuclear reactor is absorbed into the decay heat exchanger 110.

The decay heat absorbed into the decay heat exchanger 110 is sequentially transferred to the heat pipe heat exchanger 130 and the sodium-air heat exchanger 150 through the sodium loop 120.

The decay heat transferred to the heat pipe heat exchanger 130 has an influence on the operation of the heat pipe 131 depending on its temperature.

For example, in the case where the boiling point of the working fluid 131a in the heat pipe 131 is set at 400° C., when the temperature of the decay heat transferred to the hot part 133 of the heat pipe heat exchanger 130 is lower than 400° C., the decay heat is transferred to the cold part 132 of the heat pipe heat exchanger 130 through the heat pipe 131 by conduction, not by the vaporization and condensation of the working fluid 131a.

The decay heat transferred to the cold part 132 is transferred to air introduced into the heat pipe heat exchanger 130 through the first air inlet 134 and then discharged to the outside through the first air outlet 135 provided at the top of the cold part 132.

In this case, heat is also transferred from the heat pipe heat exchanger 130 to the sodium-air heat exchanger 150 through the sodium loop 120. Under normal operating conditions of a nuclear reactor, since it is not required to remove heat using the decay heat removal system, the nuclear reactor can be operated without actuating the dampers 153 provided in the second air outlet 151 and second air inlet 152 of the sodium-air heat exchanger 150.

However, when the temperature of the pool of the reactor system increases excessively to go outside the normal range, the amount of heat transferred to the decay heat exchanger 110 increases, and thus the temperatures of the sodium loop 120 and the hot part 133 of the heat pipe heat exchanger 130 increase as well.

In this case, the heat can be removed to the external air by opening the dampers 153 provided in the second air outlet 151 and second air inlet 152 of the sodium-air heat exchanger 153, so that the natural circulation in the sodium loop 120 is activated, thereby continuously removing the heat transferred from the decay heat exchanger 110.

However, when the heat transferred to the decay heat exchanger 110 from the pool of the nuclear reactor abnormally increases to such a degree that the temperature in the sodium loop 120 is continuously increased even in a state in which the cooling rate of the sodium-air exchanger 150 is maximally maintained by fully opening the dampers 153, the heat pipes 131 can be operated.

That is, when the temperatures of the sodium loop 120 and the hot part 133 of the heat pipe heat exchanger 130 reach the boiling point of the working fluid 131a, vapor is generated in the heat pipe 131 adjacent to the hot part 133 of the heat pipe heat exchanger 130 and then goes up along the inside of the heat pipe 131, and the vapor transfers heat to air supplied from the outside through the first air inlet 134 in the cold part 132, is condensed, and then goes down to the hot part 133.

In this case, when the temperature of the hot part 133 is continuously higher than the boiling point of the working fluid 131a, the natural circulation in the heat pipe 131 is continuously maintained, and thus much more heat can be removed.

According to the above decay heat removal system including the heat pipe heat exchanger, a passive decay heat removal capability can be realized by the heat pipe heat exchanger at such a high temperature at which the safety of a nuclear reactor is under threat, and a cooling effect can be obtained by the sodium-air heat exchanger at a temperature lower than that temperature, thereby minimizing thermal loss and preventing the solidification of sodium.

As described above, according to the decay heat removal system including the heat pipe heat exchanger of the present invention, since the sodium-air heat exchanger provided with dampers is connected to the heat pipe heat exchanger through the sodium loop, a passive decay heat removal capacity can be realized by the heat pipe heat exchanger even at the high temperature at which the safety of a nuclear reactor is under threat, and a cooling effect can be obtained by the sodium-air heat exchanger at a temperature lower than that temperature. Therefore, thermal loss can be minimized, and the solidification of sodium can be prevented, thereby improving the operational safety of a nuclear reactor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A decay heat removal system, comprising:
a decay heat exchanger that absorbs decay heat generated by a nuclear reactor;

a heat pipe heat exchanger that receives the decay heat from the decay heat exchanger through a sodium loop for heat removal and then discharges the decay heat to an outside; and a sodium-air heat exchanger that is connected to the heat pipe heat exchanger through the sodium loop and discharges the decay heat transferred thereto through the sodium loop to the outside, wherein the heat pipe heat exchanger is divided into a cold part including a first air outlet at a top thereof and a first air inlet at a bottom thereof and a hot part filled with sodium, and is provided therein with a heat pipe, one side of which is in contact with the hot part and the other side of which is exposed to the cold part, wherein the sodium loop is connected to the hot part of the heat pipe heat exchanger, wherein in the heat pipe located in the hot part, a working fluid is boiled to produce a vapor, and thus heat is transferred to the heat pipe exposed to the cold part through the vapor, and in the cold part, the heat is discharged to the outside, and simultaneously the vapor is condensed into a liquefied working fluid again, and then the liquefied working fluid returns to the hot part, wherein the heat pipe is filled with a working fluid, and the working fluid is NaK, wherein the sodium-air heat exchanger is provided at a top thereof with a second air outlet and at a bottom thereof with a second air inlet, and the second air outlet and the second air inlet respectively are provided therein with dampers, and wherein, when the temperature of the hot part continuously increases even in a state in which the dampers are maximally opened, the working fluid circulates in the heat pipe and simultaneously is boiled and condensed repeatedly by the decay heat transferred to the hot part, and is thus cooled by air supplied through the first air inlet.

2. The decay heat removal system according to claim 1, wherein, when a temperature of the hot part is lower than a boiling point of the working fluid, the heat transfer of the hot part to the cold part through the heat pipe is performed by conduction.

3. A decay heat removal system, comprising:
a heat pipe heat exchanger that is divided into a hot part filled with sodium and a cold part including a first air outlet at a top thereof and a first air inlet at a bottom thereof, and that is provided therein with a heat pipe, one side of which is in contact with the hot part and the other side of which is exposed to the cold part, wherein the hot part is connected to a decay heat exchanger through a sodium loop, and thus decay heat transferred to the hot part from the decay heat exchanger through the sodium loop is discharged to an outside, wherein the discharge of the decay heat by the heat pipe is performed by conduction or by repetition of vaporization and condensation of a working fluid charged in the heat pipe depending on a temperature of the decay heat, wherein the heat pipe is filled with a working fluid, and the working fluid is NaK.

* * * * *